(12) United States Patent
Nielsen et al.

(10) Patent No.: US 9,647,573 B2
(45) Date of Patent: May 9, 2017

(54) LOW-POWER POWER SUPPLY

(71) Applicant: PR Electronics A/S, Rønde (DK)

(72) Inventors: Mads Kolding Nielsen, Hovedgård (DK); Stig Alnøe Lindemann, Nøjbjerg (DK)

(73) Assignee: PR Electronics A/S, Rønde (DK)

( * ) Notice: Subject to any disclaimer, the term of this patent is extended or adjusted under 35 U.S.C. 154(b) by 284 days.

(21) Appl. No.: 14/394,308

(22) PCT Filed: Apr. 11, 2013

(86) PCT No.: PCT/DK2013/050101
§ 371 (c)(1),
(2) Date: Oct. 14, 2014

(87) PCT Pub. No.: WO2013/152774
PCT Pub. Date: Oct. 17, 2013

(65) Prior Publication Data
US 2015/0124508 A1 May 7, 2015

(30) Foreign Application Priority Data

Apr. 13, 2012 (DK) .................................. 2012 70186

(51) Int. Cl.
*H02M 3/07* (2006.01)
*H02M 7/537* (2006.01)
*H02M 1/00* (2006.01)

(52) U.S. Cl.
CPC ............. *H02M 7/537* (2013.01); *H02M 3/07* (2013.01); *H02M 2001/0006* (2013.01)

(58) Field of Classification Search
CPC ..... H02M 2003/071; H02M 2003/076; H02M 2003/077; H02M 2003/078; H02M 2003/072; H02M 2003/075; H02M 3/07; H02M 3/073
USPC ........................................................ 327/536
See application file for complete search history.

(56) References Cited

U.S. PATENT DOCUMENTS

| 5,554,924 | A | * | 9/1996 | McMahon | .............. G05F 1/613 323/225 |
| 6,445,623 | B1 | | 9/2002 | Zhang et al. | |
| 6,995,995 | B2 | | 2/2006 | Zeng et al. | |
| 7,113,021 | B2 | | 9/2006 | Riedel et al. | |
| 7,271,646 | B2 | | 9/2007 | Flasza | |

(Continued)

*Primary Examiner* — Harry Behm
*Assistant Examiner* — Bryan R Perez
(74) *Attorney, Agent, or Firm* — David S. Safran

(57) ABSTRACT

A low-power power supply for an electronic circuit uses an existing current input and converts the current to a higher voltage sufficient for supplying an electronic circuit. The input current generates a defined input voltage, which input voltage is initially generated by voltage drop by the input current passing at least one diode in the open direction of the diode. The input voltage, through a transistor, charges a plurality of switched capacitor networks in a first mode of operation, and in a second mode of operation, the switched capacitor networks are coupled in series for multiplying the input voltage to second higher voltage that is supplied to a oscillating circuit. The oscillating circuit drives the input current via a transformer and half bridge driver to convert a low voltage current supply from a low voltage current into a low current and higher voltage useable for supplying a small electronic circuit.

2 Claims, 2 Drawing Sheets

(56) References Cited

U.S. PATENT DOCUMENTS

| | | | |
|---|---|---|---|
| 7,564,273 B2 | 7/2009 | Guyton et al. | |
| 2004/0061537 A1* | 4/2004 | Flasza | H02J 7/345 |
| | | | 327/157 |
| 2011/0032026 A1* | 2/2011 | Pelley | H02M 3/07 |
| | | | 327/536 |
| 2011/0299303 A1* | 12/2011 | Lee | H02J 3/385 |
| | | | 363/21.02 |

* cited by examiner

LOW-POWER POWER SUPPLY

BACKGROUND OF THE INVENTION

Field of the Invention

The present invention relates to a low-power power supply for an electronic circuit, which power supply comprises an input current source that generates a DC current which is converted to an output voltage that is used for to supply power for an electronic circuit.

Description of Related Art

U.S. Pat. No. 7,564,273 B2 discloses a switched-capacitor network and method for performing an analogue circuit function. The circuit includes a switched-capacitor network, a comparator, and a voltage-offset network. The switched-capacitor network includes multiple switches, each having a respective threshold voltage and connected to one of a high-limit voltage, a low-limit voltage, and electrical ground. A first comparator input terminal in communication with the switched-capacitor network is configured to receive a node voltage there from during a first phase. The second input terminal is configured to receive one of the high-limit voltage and the low-limit voltage. The voltage-offset network provides a voltage shift at the first input terminal setting an input reference level at a mid-level voltage with respect to the high-limit voltage and the low-limit voltage. The voltage shift enables the first terminal to receive full-swing voltages when the high-limit voltage is less than twice the threshold voltage, with power supply voltages below twice the threshold voltage.

SUMMARY OF THE INVENTION

It is the object of the invention to achieve a local low power supply using an existing current input and convert the current to a higher voltage sufficient for the supply of an electronic circuit.

The object can be fulfilled if the input current in a first mode of operation is connected by a line to a first set of terminals of a switched capacitor networks, which input current further is generating a defined input voltage, which input voltage is generated by voltage drop by the input current, which input voltage is through a transistor and a line connected to a second set of terminal at the switched capacitor networks and herby charging the plurality of switched capacitor networks, based on a switching signal is the power supply switched into a second mode of operation which switched capacitor networks is coupled serial for multiplying the input voltage to second higher voltage, which second higher voltage is supplied to a oscillating circuit, which oscillating circuit via transformer and rectifier drives the input current.

Hereby can be achieved that a low voltage current supply can be converted from a low voltage current into a low current and higher voltage useable for the supply of a small electronic circuit. By the power supply as disclosed a very low voltage drop and a low current already circulating in a system can be used for generating supply power for an electronic circuit.

The power supply can comprise at least one transistor, which transistor is by an emitter terminal connected to the input voltage, which transistor comprises a collector connected to the reference voltage generated by the drop across the switching capacitors placed in parallel to the diodes, which transistor comprises a base connected to a resistor and a reference voltage component, which resistor is further connected to the input voltage which voltage reference is connected the high voltage side of the switched capacitor network.

DETAILED DESCRIPTION OF THE INVENTION

Figure 1:
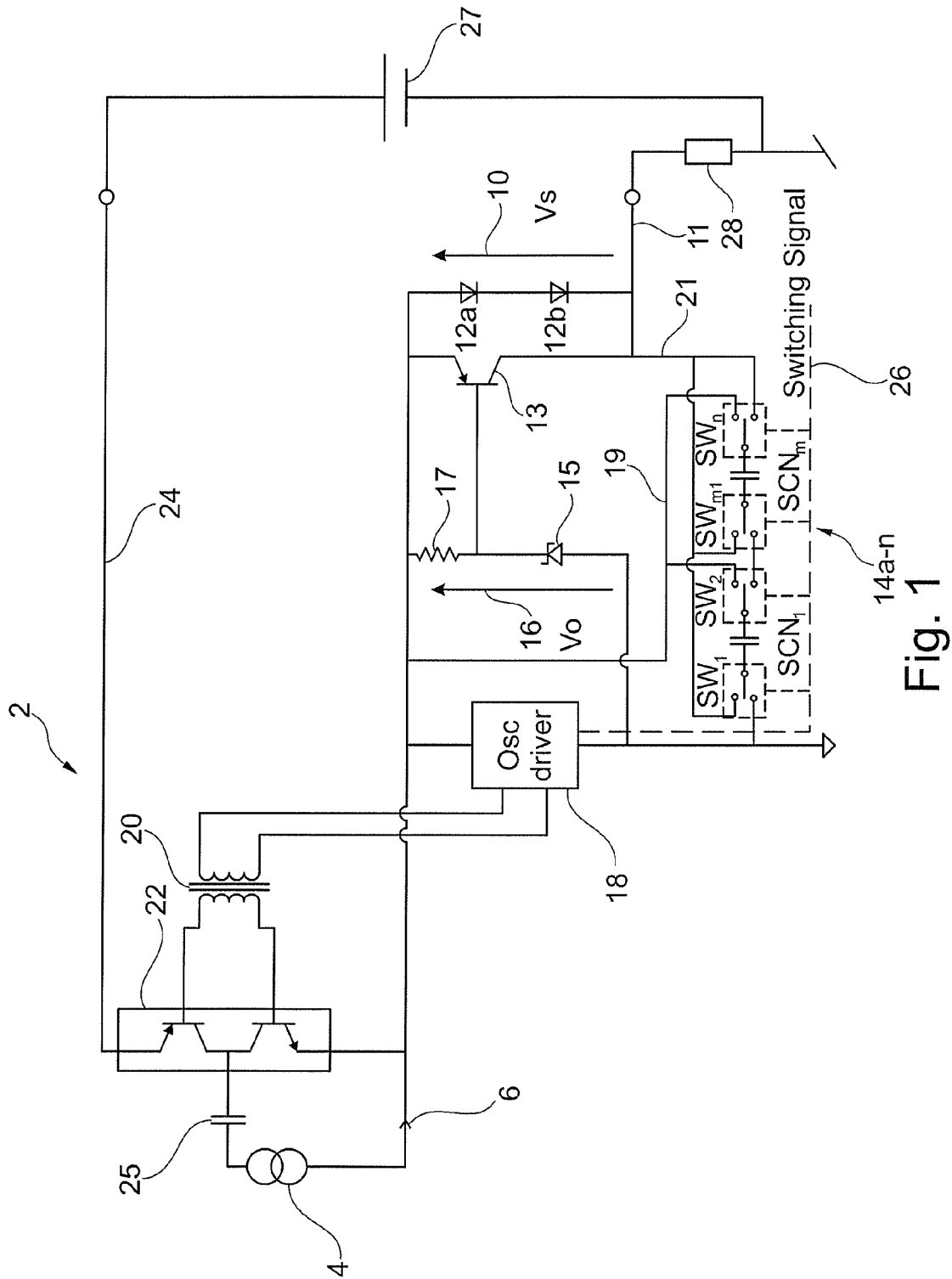
FIG. 1 discloses one possible embodiment for the invention.

FIG. 1 discloses a power supply 2 powered from a variable DC current supply. A low voltage drop over a plurality of diodes 12a, 12b charges through the transistor 13 and a switched capacitor network 14a-n in a first, charging situation. This switched capacitor network 14a-n is further connected to the oscillator driver circuit 18 in a second, discharge situation. This drives a transformer 20 with an AC signal. The output from the transformer 20 controls a half bridge driver 22, which half bridge driver 22 is further connected to the line in which the input current 6 is flowing. A midpoint of the half bridge driver 22 is connected through a capacitor 25 to the current generator 4. The half bridge driver 22 generates an AC signal from supplied output voltage 24 towards the current generator 4.

Further, a voltage supply 27 is connected to the output voltage 24. A sensing resistor 28 is connected to the collector of the transistor 13 through line 11. In a preferred embodiment of the invention, the oscillator driver 18 is connected to a switching signal 26, which switching signal is further connected to the switched capacitor network 14a-n.

Figure 2:
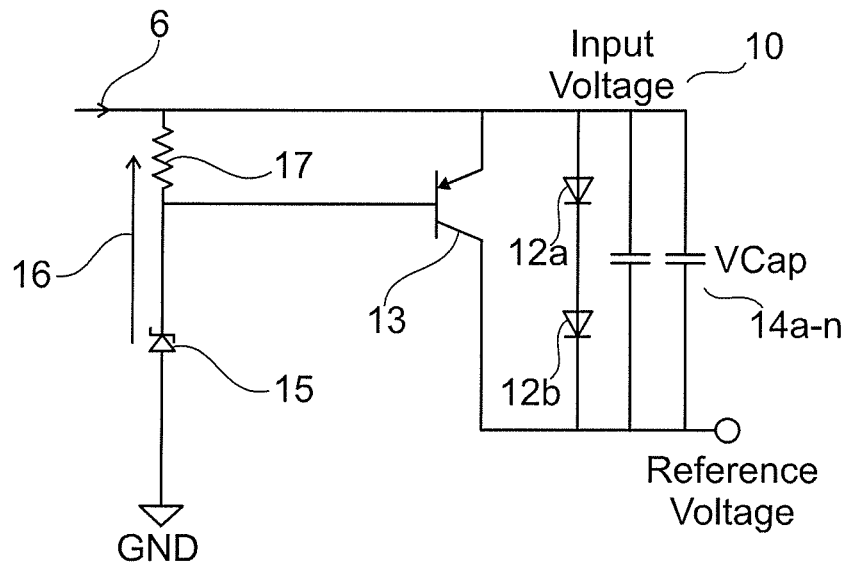
FIG. 2 shows an equivalent diagram for a charging mode of operation.

FIG. 2 shows an equivalent diagram for a charging mode of operation, where parallel coupling of the switched capacitor network 14a-n to the input voltage 10 is indicated.

Figure 3:
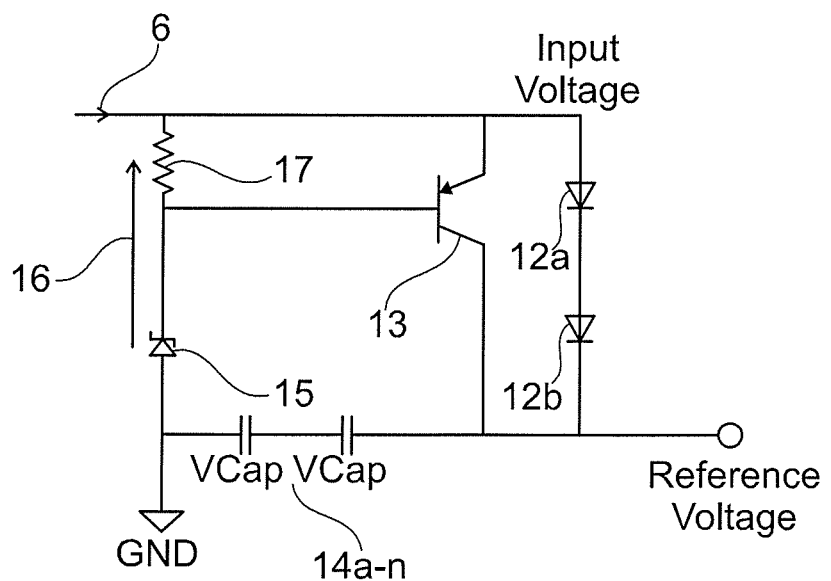
FIG. 3 shows an equivalent diagram for a discharging mode of operation.

FIG. 3 shows an equivalent diagram for a discharging mode of operation. The switched capacitor network 14a-n is now coupled in series and an output voltage 16 is generated.

For low power applications where a circuit power supply is needed with low current consumption and is powered from the existing current loop flow through the circuit, two possible solutions exist; either the power supply needs to be placed in parallel with the current flow or in series. When placed in parallel, the current partly flows through the power supply and partly through rest of the circuit, this gives a non-existing voltage drop, but if there isn't enough overhead in the current flow to power the internal power supply, a stable voltage can't be maintained.

A series solution offers minimum current consumption due to fact that the current already flowing in the loop is used for powering the power supply. The disadvantage is the voltage drop across the power supply due to the current flowing though the power supply.

To create a low voltage drop (Vs) 10 and still maintain a minimum supply voltage (Vo) 16, a number of switched capacitor networks (SCN) 14a-n can be cascaded as shown. Thus, the voltage drop can be defined as:

Voltage drop($V_s$)10=$V_o$ 16/($n$'th order SCN+1)14a-n

The only limit comes from the current that the power supply needs to supply to the rest of circuit, for each switched capacitor network 14a-n added, the maximum current the power supply can supply is lowered.

An implementation usage of the power supply 2 can be in a mA to mA isolator where the power supply 2 is implemented on the output side, powered from the mA signal 6 from the input. The power supply 2 is used for powering the circuit controlling the signal transfer from input to output.

A boot strap mechanism is implemented by the diodes 12a,12b across the transistor 13 ensuring enough initial current flow until the Vo 16 rises up to the preferred level and starts the oscillator driver circuit 18 that enables the signal transfer from input to output. An external power supply is applied on the output side for powering the whole circuit which ensures that energy is present to power up the internal power supply.

What is claimed is:

1. Power supply for an electronic circuit, which power supply comprises: an input current source which generates a DC current for supplying power to an electronic circuit, a plurality of switched capacitor networks, each of which has a capacitor, a first set of terminals and a second set of terminals, and means for producing a switching signal connected to the switched capacitor networks, wherein the switched capacitor networks have a first mode of operation in which the input current source is connected by a first line to the first set of terminals and wherein a defined input voltage is generated by a voltage drop by the input current, the defined input voltage being connected to the second set of terminals through a transistor and a second line so that the plurality of switched capacitor networks are charged coupled in parallel, where the switched capacitor network has a second mode of operation in which the capacitors are switched by the switching signal from being coupled in parallel to being coupled in series for multiplying the input voltage to second higher output voltage which is supplied to a oscillating circuit via a transformer and half bridge driver, and wherein the supplied output voltage generates the input current from the input current source.

2. Power supply according to claim 1, wherein the power supply comprises at least one transistor, which transistor is connected by an emitter terminal to the input voltage, which transistor comprises a collector connected to a reference voltage, which transistor comprises a base connected to a resistor and a reference voltage component, which resistor is further connected to the input voltage and which voltage reference is connected a high voltage side of the switched capacitor network.

* * * * *